(12) United States Patent
Kim et al.

(10) Patent No.: US 8,053,689 B2
(45) Date of Patent: Nov. 8, 2011

(54) COMMUNICATION TERMINAL HAVING HOUSING WITH KEY BUTTONS COUPLED THERETO

(75) Inventors: Tae Hyun Kim, Anyang-si (KR); Kyung Soo Ji, Suwon-si (KR); Jong Won Lim, Anyang-si (KR)

(73) Assignee: LG-Ericsson Co., Ltd., Seoul (KR)

( * ) Notice: Subject to any disclaimer, the term of this patent is extended or adjusted under 35 U.S.C. 154(b) by 364 days.

(21) Appl. No.: 12/409,720

(22) Filed: Mar. 24, 2009

(65) Prior Publication Data

US 2009/0242375 A1  Oct. 1, 2009

(30) Foreign Application Priority Data

Mar. 27, 2008 (KR) ................... 10-2008-0028584

(51) Int. Cl.
*H01H 13/70* (2006.01)
(52) U.S. Cl. .......... 200/5 A; 200/296; 200/341; 200/343
(58) Field of Classification Search ................ 200/5 R, 200/5 A, 511, 512, 296, 302.1, 302.2, 341, 200/343, 330, 331, 333; 341/22; 345/168, 345/169

See application file for complete search history.

(56) References Cited

U.S. PATENT DOCUMENTS

| | | | |
|---|---|---|---|
| 4,128,744 A * | 12/1978 | Seeger | 200/5 A |
| 4,613,736 A * | 9/1986 | Shichijo et al. | 200/317 |
| 5,311,656 A | 5/1994 | Eldershaw | |
| 6,169,256 B1 * | 1/2001 | Hanahara et al. | 200/5 A |
| 6,469,256 B1 * | 10/2002 | Miller et al. | 174/255 |
| 6,727,447 B2 * | 4/2004 | Hentunen | 200/302.2 |
| 7,067,757 B1 * | 6/2006 | Chadha | 200/512 |
| 7,151,237 B2 * | 12/2006 | Mahoney et al. | 200/512 |
| 7,256,363 B1 * | 8/2007 | McConnell et al. | 200/343 |

FOREIGN PATENT DOCUMENTS

| | | |
|---|---|---|
| JP | 11-355410 | 12/1999 |
| KR | 10-2007-0093200 | 9/2007 |
| KR | 10-2007-0093275 | 9/2007 |
| RU | 55 236 | 7/2006 |
| WO | WO 84/01051 | 3/1984 |

OTHER PUBLICATIONS

Korean Office Action dated Aug. 27, 2009.
Russian Office Action issued in RU Application No. 2009111189/09 dated Aug. 3, 2010 (full Russian text and full English translation).

* cited by examiner

*Primary Examiner* — Michael Friedhofer
(74) *Attorney, Agent, or Firm* — KED & Associates, LLP

(57) ABSTRACT

A communication terminal including a housing having elastic key buttons integrally coupled thereto is provided. The housing is configured to define an external appearance of the communication terminal. Each of the key buttons may have one end thereof integrally coupled to the housing and a free end at an opposite end thereof. A plurality of key-input switches may be respectively positioned beneath each key button. Each of the key-input switches may detect a corresponding key-input when the free end of the key button is brought into contact with the key-input switch.

20 Claims, 5 Drawing Sheets

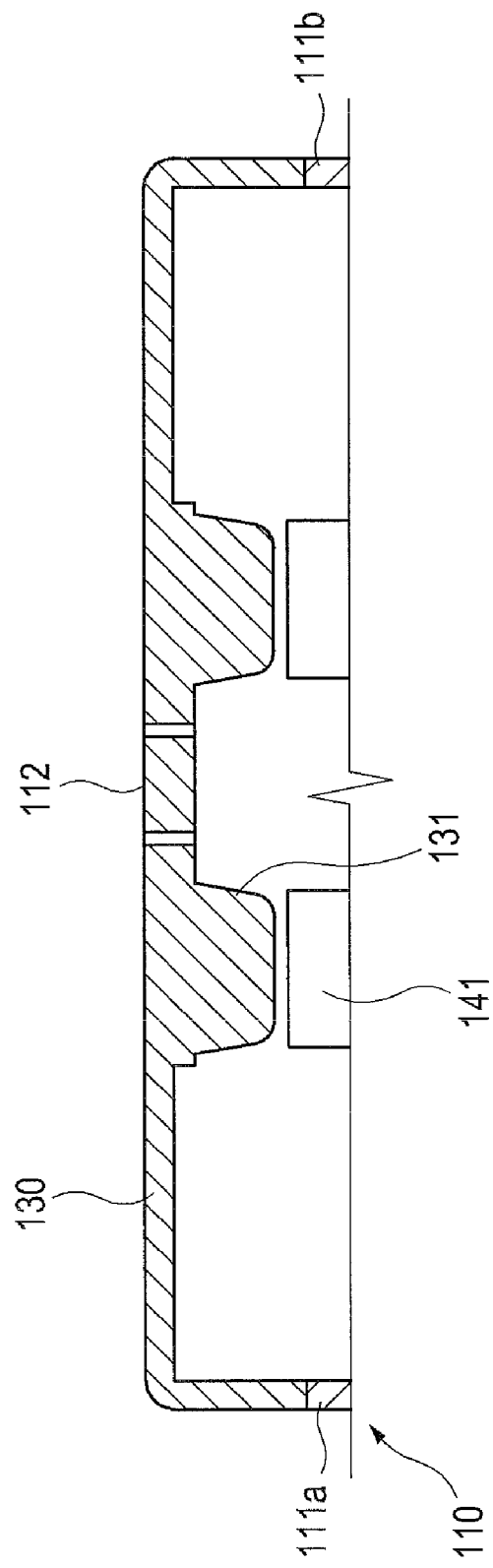

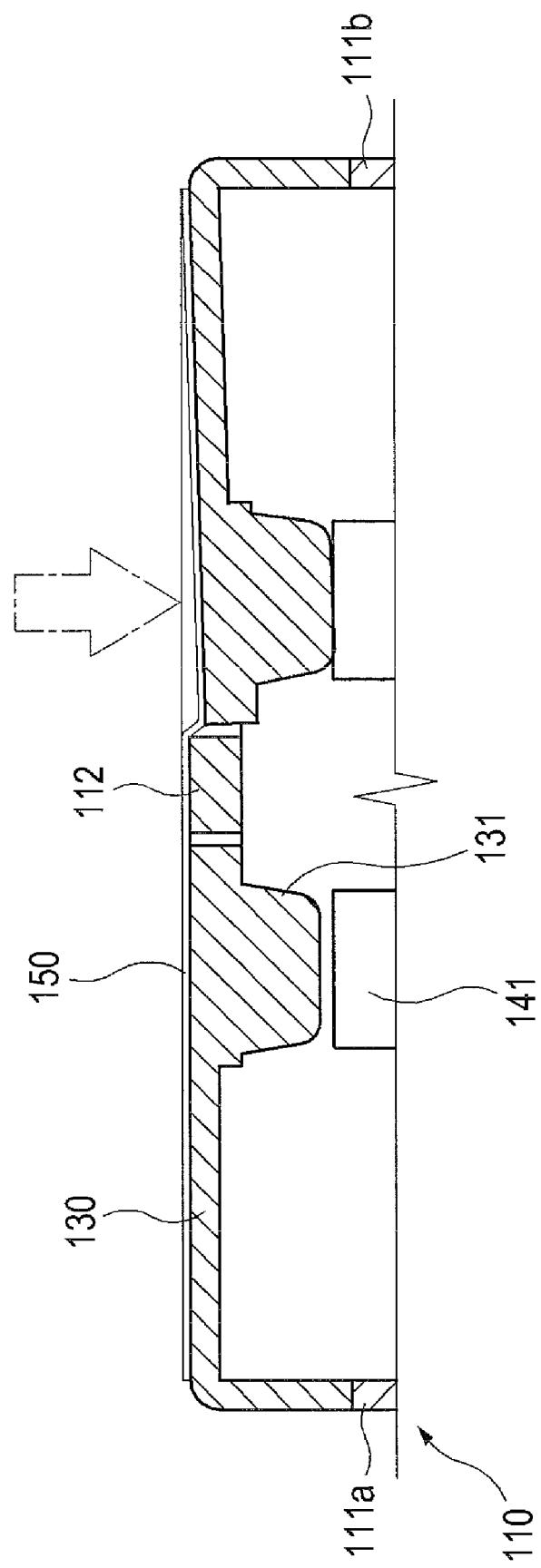

COMMUNICATION TERMINAL HAVING HOUSING WITH KEY BUTTONS COUPLED THERETO

This application claims priority to Korean Patent Application No. 10-2008-0028584, filed in Korea on Mar. 27, 2008, the entirety of which is incorporated herein by reference.

BACKGROUND

1. Field

This relates to a communication terminal and, more particularly, to a communication terminal having a housing with key buttons formed integrally therewith.

2. Background

Communication terminals such as, for example, wired telephones, wireless portable phones, and the like may include a key pad as a user input device. Users may input numerals, characters, and the like into the communication terminal using the key pad. This type of key pad may include key buttons provided with a key button case, and key-input switches biased by springs against the pressing of the key buttons. When a user presses a key button, the key button may be moved against the force of the spring to contact the key-input switch. When the key button is released, the key button may return to its initial position by the force of the spring. An input device having fewer parts and a more simple structure would be desirable.

BRIEF DESCRIPTION OF THE DRAWINGS

The embodiments will be described in detail with reference to the following drawings in which like reference numerals refer to like elements wherein:

FIG. 2 is a cross-sectional view taken along line A-A of FIG. 1A;

FIG. 4 is a cross-sectional view of a communication terminal in accordance with another embodiment as broadly described herein.

DETAILED DESCRIPTION

A detailed description may be provided with reference to the accompanying drawings. One of ordinary skill in the art may realize that the following description is illustrative only and is not in any way limiting. Other illustrative embodiments may readily suggest themselves to such skilled persons having the benefit of this disclosure.

Figure 1A:
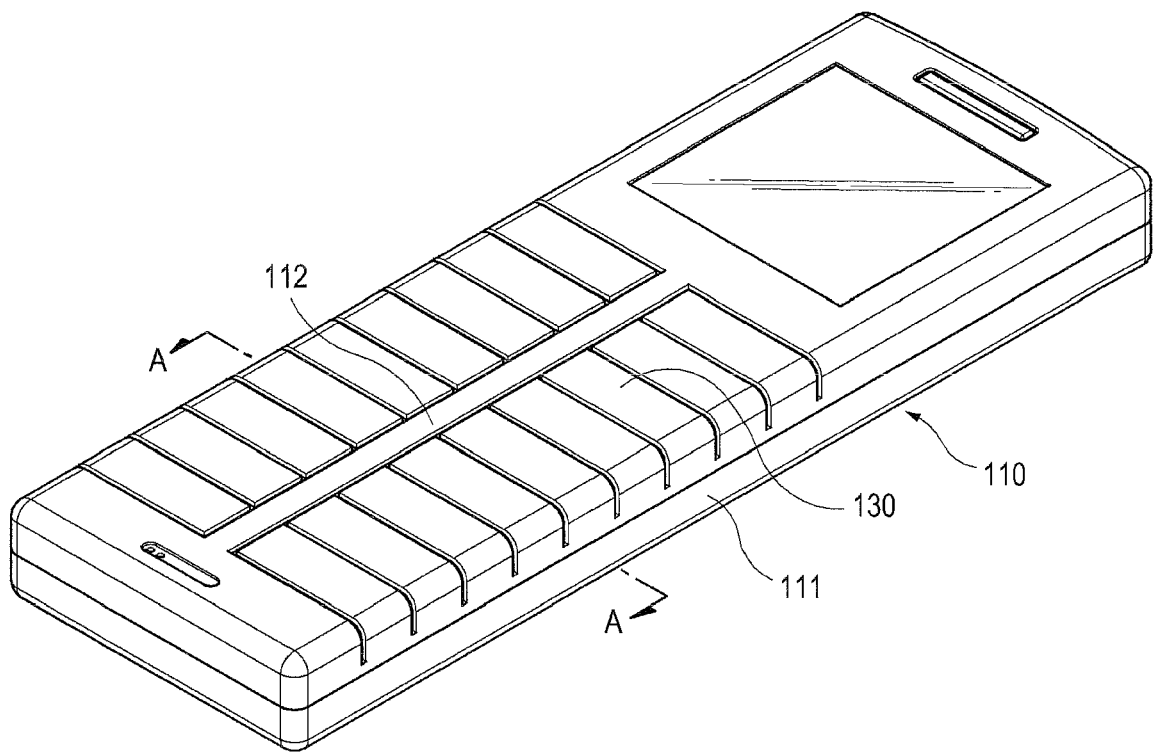
FIGS. 1A and 1B are perspective views of exemplary communication terminals as embodied and broadly described herein.
Figure 1B:
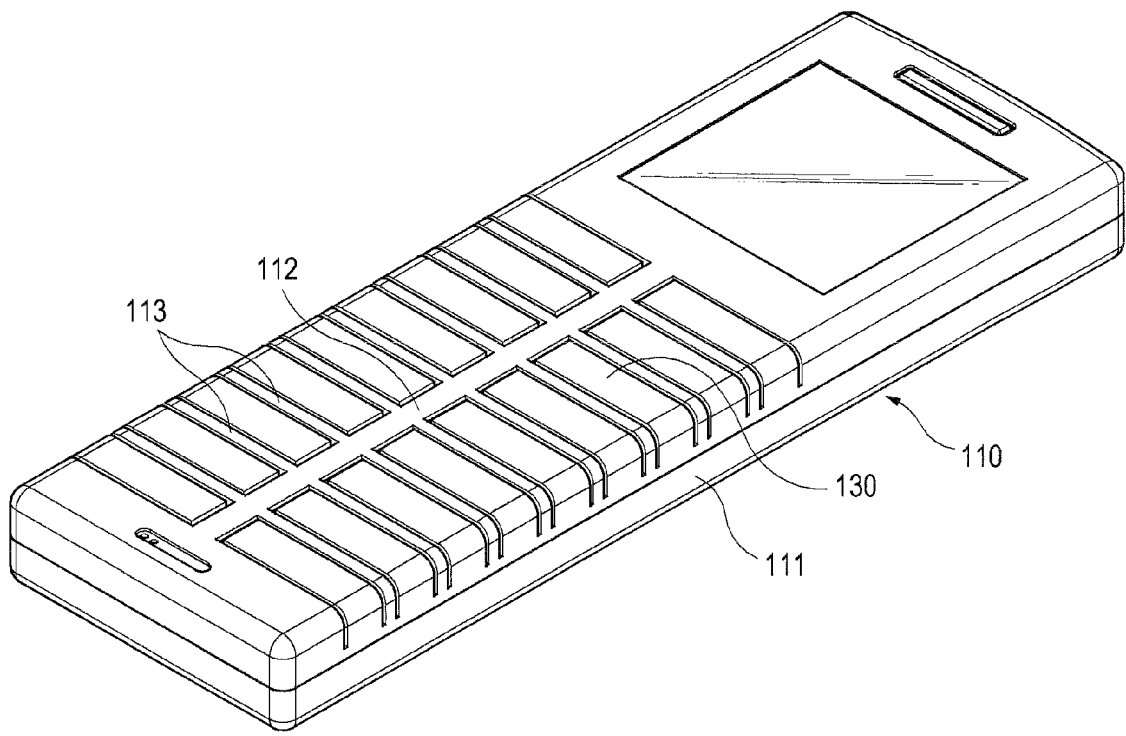
Figure 3:
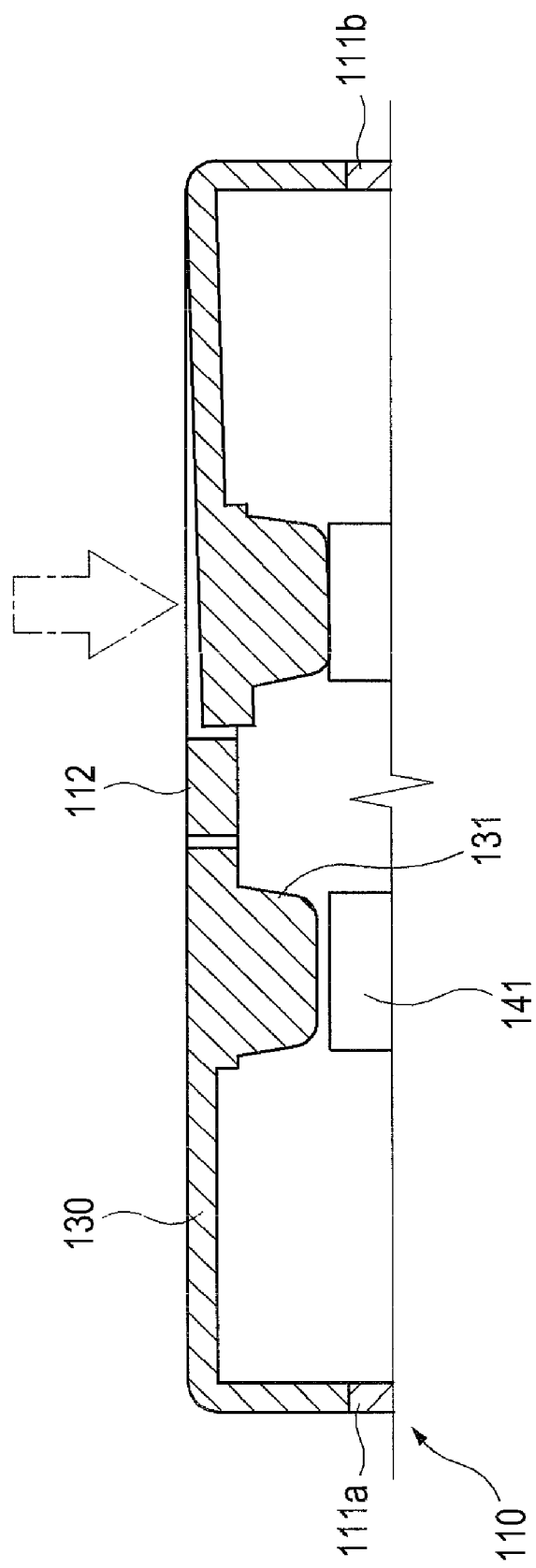
FIG. 3 is a cross-sectional view taken along line A-A of FIG. 1A, illustrating a key button brought into contact with a corresponding key-input switch.

Referring now to FIGS. 1A-1B and 2, a communication terminal as embodied and broadly described herein may include a housing 110, a plurality of key buttons 130 provided with the housing 110, and a plurality of key input switches 141 respectively positioned beneath corresponding key buttons 130.

Housing 110 may form an external appearance of the communication terminal. Housing 110 may have two side walls 111 that define opposite lateral sides of the housing 110. In one embodiment, a plurality of key buttons 130 may be arranged in two parallel columns, extending parallel to the two side walls 111. For example, as shown in FIG. 2, one column of the plurality of key buttons 130 may be arranged along a top edge of one side wall 111a, and another column of the plurality of key buttons 130 may be arranged along a top edge of the other side wall 111b. Such an arrangement of the plurality of key buttons 130 may form a top surface of the housing 110. Other arrangements of the plurality of key buttons 130 may also be appropriate, depending on the orientation of the plurality of key buttons 130, the number of key buttons 130 and size of the communications terminal, and other such factors.

In each column of key buttons 13, the plurality of key buttons 130 may extend inwardly from the top edge of its respective side wall 111 of housing 110. More specifically, in certain embodiments, one end of the plurality of key buttons 130, such as the end adjacent to its respective side wall 111, may be fixed to, or integrally formed with, integrally provided with, or integrally coupled to, its respective side wall 111 of housing 110, while an opposite end of each of the plurality of key buttons 130 may serve as a free end. In other words, each of the plurality of key buttons 130 may be configured as a cantilever, with a first end thereof fixed to its respective side wall 111 and an opposite end free to move. Therefore, each of the plurality of key buttons 130 may be moveable with respect to the housing 110 except for the portion, i.e., the end, thereof that is fixed to the housing 110.

The plurality of key buttons 130 may be fabricated from an elastic material such as, for example, metal, plastic, and the like. Other materials having elastic properties may also be appropriate. Thus, each of the plurality of key buttons 130 may be spaced-apart from corresponding key-input switches 141 by a predetermined distance when no external force is applied to the plurality of key buttons 130, as illustrated in FIG. 2.

Each of the plurality of key buttons 130 may have a contacting portion 131 provided on a bottom surface thereof Contacting portion 131 may be configured to protrude from the bottom surface of its respective key button 130 toward its corresponding key-input switch 141. Accordingly, as a user presses on any of the plurality of key buttons 130, its contacting portion 131 may be moved toward the appropriate key-input switch 141, and thus be brought into contact therewith. Then, the key-input switch 141 may be activated and a corresponding key-input detected. Release of the pressure causes the key button 130 to return to its initial position due to its own elasticity, and the key-input switch 141 to be restored to its initial deactivated state.

Housing 110 may include a center frame member 112. Center frame member 112 may extend between the two columns of key buttons 130. Center frame member 112 may prevent a key button 130 in the first column and an adjacent key button 130 in the second column from being pressed together. That is, when a user wants to press down on only a single key button 130, the center frame member 112 may prevent key buttons 130 other than the desired key button 130 from being inadvertently pressed.

In another embodiment, housing 110 may further include one or more transverse frame members 113 for preventing erroneous pressing of more than one key button 130 in the same column, as shown in FIG. 1B. each of the one or more transverse members 113 may extend from the center frame member 112 and be positioned between two adjacent key buttons 130 in the same column of key buttons 130. In such a case, adjacent key buttons 130 in the same column may be prevented from being unintentionally pressed together. The transverse frame members 113 may extend from the center frame member 112 either partially or substantially all the way to the side walls 111, as long as the end of the key buttons 130 remain freely moveable with respect to the housing 110.

In alternative embodiments, the plurality of key buttons 130 may instead have a fixed end that is fixed to the center frame member 112, with free ends adjacent to the side walls 111 of the housing 110. In this case, the transverse frame members 113 would instead extend from the side walls 111 of the housing 110 toward the center frame member 112.

FIG. 4 is a cross-sectional view of another exemplary embodiment of a communication terminal as broadly described herein. In this embodiment, the communication terminal may further include a sheet member 150 provided on the housing 110 and the plurality of key buttons 130. Sheet member 150 may be, for example, a protecting film which may prevent foreign substances from entering into the communication terminal through apertures or openings between the housing 110 and the plurality of key buttons 130 or in between adjacent key buttons 130.

Moisture that permeates into the housing 110 through the apertures or openings may adversely affect the operations of a printed circuit board (not shown) that may be mounted within the terminal. In other words, the permeating moisture may cause a short circuit, an electric leakage, or other adverse impact to the printed circuit board, thereby leading to malfunction of the terminal, corrosion of metal components of the printed circuit board, mold, or the like.

In one embodiment, the sheet member 150 may be coated on the housing 110 so as to cover at least a portion of housing 110 at which the plurality of key buttons 130 are disposed. In another embodiment, sheet member 150 may cover an entire outer surface of housing 110. Sheet member 150 may be, for example, an elastic and waterproof film. Sheet member 150 may stretch in conformity with the pressure applied to the plurality of key buttons 130. Further, sheet member 150 may shrink or return back to its original state when the pressure from pressing the plurality of key buttons 130 is removed. As such, sheet member 150 does not obstruct the pressure to be applied to the plurality of key buttons 130 and the key-inputs associated therewith. When sheet member 150 is torn or its adhesion to the housing 110 becomes poor, sheet member 150 may be replaced with a new one.

Embodiments as broadly described herein may provide a communication terminal. The communication terminal may have a housing with elastic key buttons integrally coupled thereto. Each key button 130 may recover its initial position by means of its own elasticity. Accordingly, the communication terminal does not need a separate case for holding key buttons and springs for allowing key buttons to return to their initial position. Thus, the communication terminal may be constructed with simple structure using fewer parts.

A communication terminal as embodied and broadly described herein may include a housing, a plurality of elastic key buttons and a plurality of key-input switches. The housing may be sized, shaped and/or designed to desired appearance of the communication terminal. Each of the key buttons may be configured to be substantially integrally coupled to the housing at one end thereof and to have a free end at an opposite end thereof. The key-input switches are respectively positioned beneath the key button. Each of the key-input switches is configured to detect key-input when the free end of the key button is brought into contact with the key-input switch.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A communication terminal, comprising:
   a housing including first and second opposite lateral side walls;
   a plurality of elastic key buttons formed as extensions from the first and second lateral side walls of the housing, wherein each of the plurality of key buttons has a first end that extends directly from a top edge of its respective lateral side wall of the housing toward a central portion of the housing and a second end opposite the first end that moves freely with respect to the housing; and
   a plurality of key-input switches respectively positioned beneath the plurality of key buttons, wherein each of the plurality of key-input switches is configured to detect a key-input when the second end of its respective key button is brought into contact therewith.

2. The terminal of claim 1, wherein top surfaces of the plurality of key buttons, from the respective first ends to second ends thereof, define a top surface of a corresponding portion of the housing.

3. The terminal of claim 2, wherein each of the plurality of key buttons has a contacting portion formed on a bottom surface of the second end thereof, wherein the contacting portion extends from the bottom surface of each key button toward its respective key-input switch, wherein the contacting portion directly contacts its respective key-input switch in response to depression of the corresponding key button.

4. The terminal of claim 1, wherein the plurality elastic key buttons are arranged in first and second columns arranged side by side between opposite lateral sides of the housing.

5. The terminal of claim 4, wherein the plurality of key buttons comprises a plurality of cantilevers, and wherein each of the cantilevers has a fixed end integrally coupled to one of the two opposite lateral sides of the housing, and each of the cantilevers in the first column has a free end opposite the fixed end and facing a free end of a corresponding cantilever positioned adjacent thereto in the second column.

6. The terminal of claim 5, wherein the housing further comprises a frame member positioned adjacent to each of the plurality of key buttons, wherein the frame member prevents movement of more than one of two adjacent key buttons at the same time.

7. The terminal of claim 6, wherein the frame member comprises a center frame member that extends between the first and second columns of key buttons.

8. The terminal of claim 7, wherein the second ends of the key buttons in the first column are positioned next to second ends of the key button in the second column, with the center frame member positioned therebetween.

9. The terminal of claim 8, wherein the frame member further comprises a plurality of transverse frame members, wherein each of the plurality of transverse frame members extends outward from the center frame member, between two adjacent key buttons in one of the two columns, and toward one of the two lateral side walls of the housing.

10. The terminal of claim 1, wherein the terminal further comprises a sheet member provided on at least a portion of the housing at which the plurality of key buttons are disposed.

11. The terminal of claim 10, wherein the sheet member fully covers a surface of the housing at which the key buttons are disposed.

12. The terminal of claim 10, wherein the sheet member covers an entire outer surface of the housing.

13. A communication terminal, comprising:
- a housing; and
- a key input device provided on an input surface of the housing, the key input device comprising:
- a plurality of key buttons arranged on the input surface of the housing, wherein the plurality of key buttons comprises a plurality of cantilevers each having a fixed proximal end integrally coupled to a top edge of one of the two opposite lateral sides of the housing, and each having a free moving distal end opposite its fixed proximal end, and wherein top surfaces of the plurality of key buttons, from the respective fixed proximal ends to the moving distal ends thereof, define a top surface of a corresponding portion of the housing; and
- a plurality of switches respectively positioned beneath the plurality of key buttons, wherein each of the plurality of switches is activated upon contact with the free moving distal end of a corresponding key button of the plurality of key buttons while the fixed proximal end thereof remains fixed relative to the housing.

14. The terminal of claim 13, wherein depression of the key button at the free moving distal end causes the key button to flex and the distal end to contact the corresponding switch, while the proximal end remains fixed to the housing.

15. The terminal of claim 14, wherein each of the plurality of key buttons further comprises a contacting portion formed on a bottom surface of the distal end thereof such that the contacting portion directly contacts the corresponding switch when the key button is depressed so as to activate the switch.

16. The terminal of claim 14, wherein the plurality of key buttons are arranged in first and second columns separated by a center frame member on the input surface of the housing, wherein proximal ends of the key buttons in the first column are fixed to a first lateral side wall of the housing, and proximal ends of the key buttons in the second column are fixed to a second lateral side wall of the housing opposite the first lateral side wall.

17. The terminal of claim 16, wherein free moving distal ends of the key buttons in the first and second columns are positioned adjacent to respective opposite sides of the center frame member such that the center frame member forms a barrier between the free moving distal ends of the key buttons of the first and second columns.

18. The terminal of claim 16, further comprising a plurality of transverse frame members that each extend outward from the center frame member, between respective adjacent key buttons in the first column and adjacent key buttons in the second column, and toward the first and second lateral side walls of the housing so as to form barriers between adjacent key buttons in the first column and between adjacent key buttons in the second column.

19. The terminal of claim 16, further comprising a sheet member that covers the input surface of the housing.

20. The terminal of claim 16, wherein the plurality of key buttons and the center frame are integrally formed so as to define the input surface of the housing.

* * * * *